United States Patent
Sakai et al.

(10) Patent No.: US 11,924,390 B2
(45) Date of Patent: Mar. 5, 2024

(54) APPARATUS, METHOD, AND STORAGE MEDIUM FOR PERFORMING COLOR REDUCTION PROCESSING

(71) Applicant: CANON KABUSHIKI KAISHA, Tokyo (JP)

(72) Inventors: Hiroyuki Sakai, Chiba (JP); Reiji Misawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 17/390,307

(22) Filed: Jul. 30, 2021

(65) Prior Publication Data

US 2022/0046144 A1    Feb. 10, 2022

(30) Foreign Application Priority Data

Aug. 5, 2020  (JP) .................... 2020-133367

(51) Int. Cl.
  *H04N 1/58*    (2006.01)
  *H04N 1/60*    (2006.01)

(52) U.S. Cl.
  CPC ............. *H04N 1/58* (2013.01); *H04N 1/6063* (2013.01)

(58) Field of Classification Search
  CPC .................... H04N 1/58; H04N 1/648
  See application file for complete search history.

(56) References Cited

U.S. PATENT DOCUMENTS

| | | | | |
|---|---|---|---|---|
| 5,418,574 A | * | 5/1995 | Miyabata | H04N 1/58 348/625 |
| 8,559,748 B2 | * | 10/2013 | Banerjee | G06V 30/18019 382/286 |
| 10,586,313 B2 | * | 3/2020 | Hsiao | H04N 23/70 |
| 2008/0273807 A1 | * | 11/2008 | Dauw | G06V 10/761 382/237 |
| 2018/0020118 A1 | * | 1/2018 | Misawa | G06V 10/267 |
| 2022/0046145 A1 | * | 2/2022 | Misawa | H04N 1/58 |

FOREIGN PATENT DOCUMENTS

JP    2003309727 A    10/2003

* cited by examiner

*Primary Examiner* — Barbara D Reinier
(74) *Attorney, Agent, or Firm* — Canon U.S.A., Inc. I.P. Division

(57) ABSTRACT

An apparatus includes a reduction unit configured to perform color reduction processing for quantizing a color in the generated image data, a change unit configured to change, in a case where brightness of an edge pixel indicating an edge portion in an image based on the image data with the color quantized is equal to or higher than a threshold value, a pixel value of the edge pixel to a pixel value of a color of a pixel having highest brightness among pixels surrounding the edge pixel, and change, in a case where the brightness of the edge pixel is lower than the threshold value, the pixel value of the edge pixel to a pixel value of a color of a pixel having lowest brightness among the pixels surrounding the edge pixel.

15 Claims, 18 Drawing Sheets

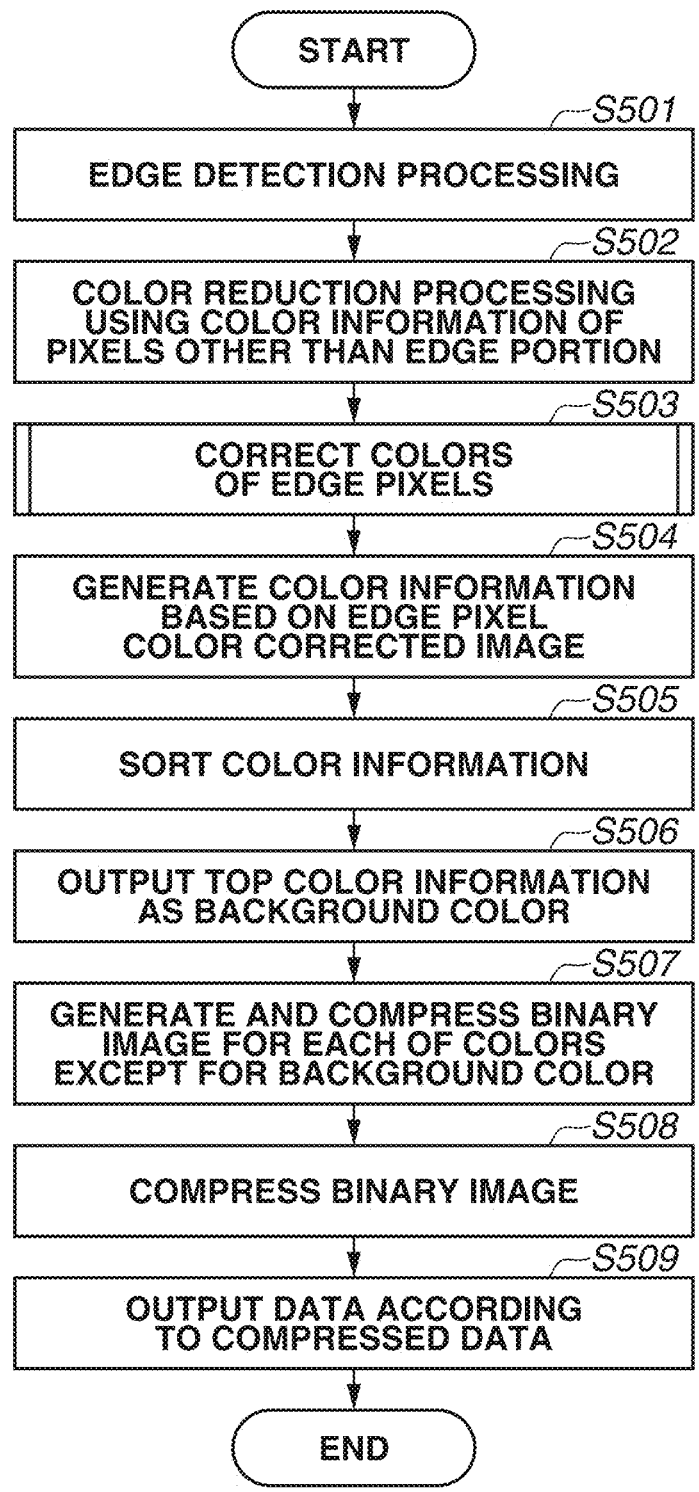

COLOR REDUCED IMAGE 304

✱: PIXEL OF INTEREST

✱: PIXEL OF INTEREST

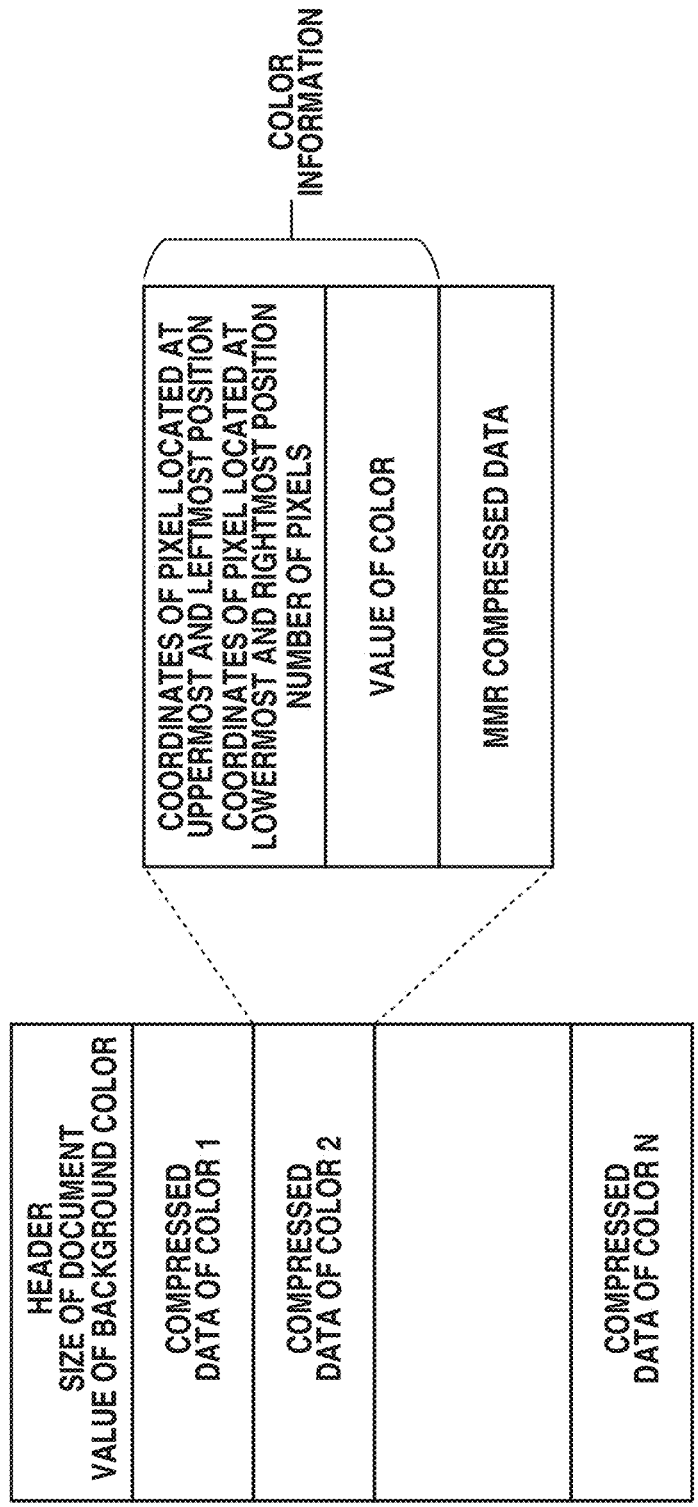

COLOR REDUCED IMAGE 304

*: PIXEL OF INTEREST

★: PIXEL OF INTEREST

FIG.11A

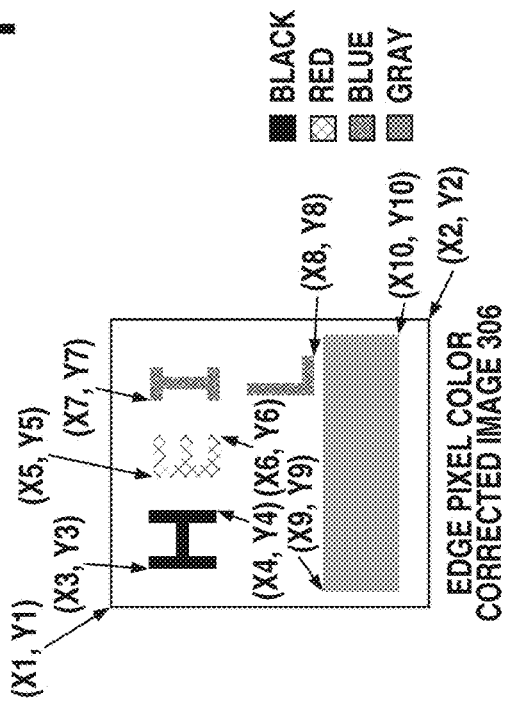

EDGE PIXEL COLOR CORRECTED IMAGE 306

■ BLACK
▨ RED
▨ BLUE
▨ GRAY

| COLOR | START COORDINATES | END COORDINATES | NUMBER OF PIXELS |
|---|---|---|---|
| WHITE | (X1, Y1) | (X2, Y2) | 1000 |
| BLACK | (X3, Y3) | (X4, Y4) | 200 |
| RED | (X5, Y5) | (X6, Y6) | 150 |
| BLUE | (X7, Y7) | (X8, Y8) | 300 |
| GRAY | (X9, Y9) | (X10, Y10) | 500 |

COLOR INFORMATION 308

FIG.11B

| COLOR | START COORDINATES | END COORDINATES | NUMBER OF PIXELS |
|---|---|---|---|
| WHITE | (X1, Y1) | (X2, Y2) | 1000 |
| BLACK | (X3, Y3) | (X4, Y4) | 200 |
| RED | (X5, Y5) | (X6, Y6) | 150 |
| BLUE | (X7, Y7) | (X8, Y8) | 300 |
| GRAY | (X9, Y9) | (X10, Y10) | 500 |

COLOR INFORMATION 308

| COLOR | START COORDINATES | END COORDINATES | NUMBER OF PIXELS |
|---|---|---|---|
| WHITE | (X1, Y1) | (X2, Y2) | 1000 |
| GRAY | (X9, Y9) | (X10, Y10) | 500 |
| BLUE | (X7, Y7) | (X8, Y8) | 300 |
| BLACK | (X3, Y3) | (X4, Y4) | 200 |
| RED | (X5, Y5) | (X6, Y6) | 150 |

SORTED COLOR INFORMATION 318

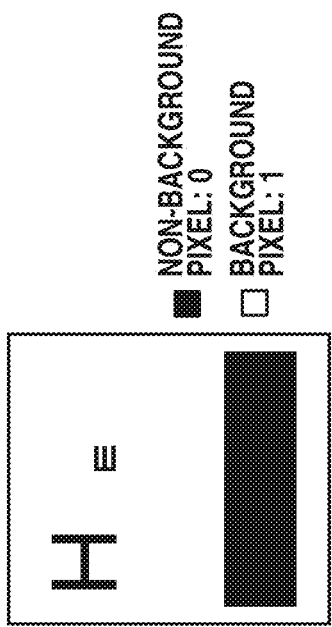
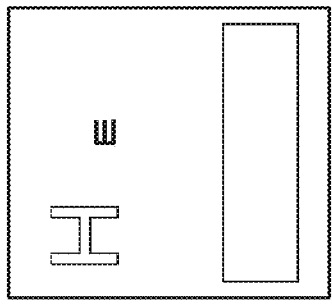
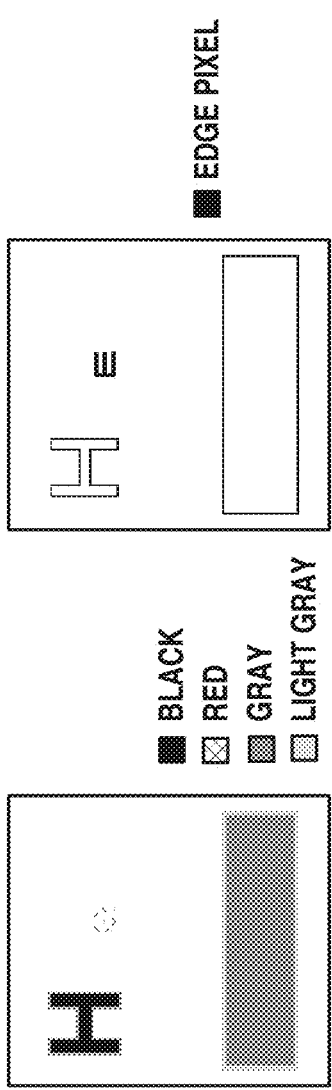
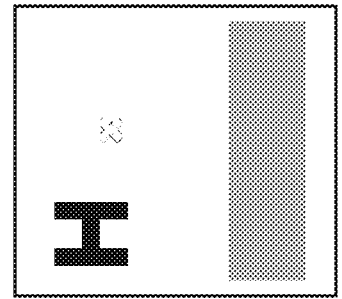
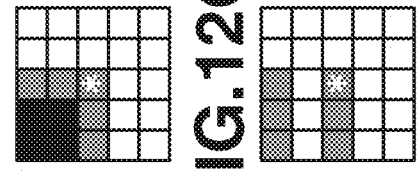
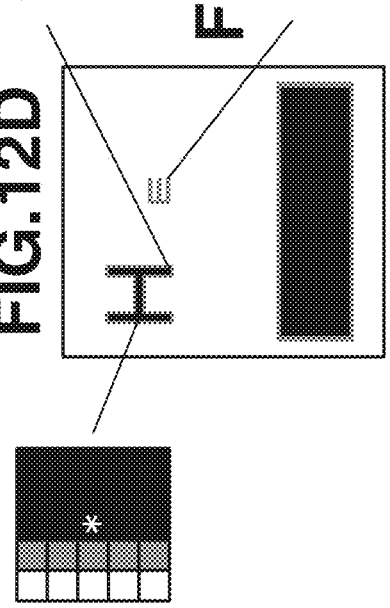

FIG.17A

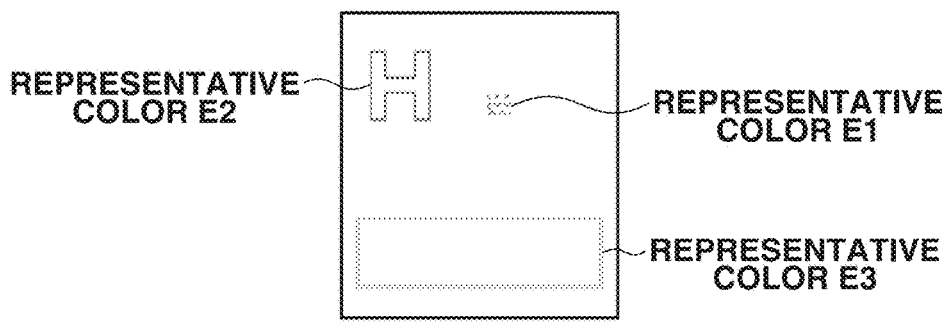

REPRESENTATIVE COLOR E2
REPRESENTATIVE COLOR E1
REPRESENTATIVE COLOR E3

FIG.17B

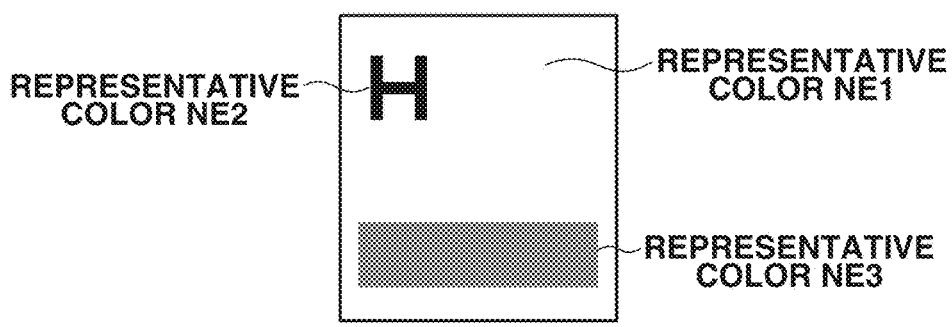

REPRESENTATIVE COLOR NE2
REPRESENTATIVE COLOR NE1
REPRESENTATIVE COLOR NE3

FIG.17C

| REPRESENTATIVE COLOR E | COLOR VALUE | NUMBER OF PIXELS |
|---|---|---|
| REPRESENTATIVE COLOR E1 | RED (R, G, B) = (255, 0, 0) | 100 |
| REPRESENTATIVE COLOR E2 | GRAY (R, G, B) = (45, 45, 45) | 200 |
| REPRESENTATIVE COLOR E3 | LIGHT GRAY (R, G, B) = (200, 200, 200) | 200 |

FIG.17D

| REPRESENTATIVE COLOR NE | COLOR VALUE | NUMBER OF PIXELS |
|---|---|---|
| REPRESENTATIVE COLOR NE1 | WHITE (R, G, B) = (255, 255, 255) | 10000 |
| REPRESENTATIVE COLOR NE2 | BLACK (R, G, B) = (0, 0, 0) | 500 |
| REPRESENTATIVE COLOR NE3 | GRAY (R, G, B) = (40, 40, 40) | 2000 |

FIG.18A

| REPRESENTATIVE COLOR E | COLOR VALUE | NUMBER OF PIXELS |
|---|---|---|
| REPRESENTATIVE COLOR E1 | RED (R, G, B) = (255, 0, 0) | 100 |
| REPRESENTATIVE COLOR E2 | GRAY (R, G, B) = (40, 40, 40) | 200 |
| REPRESENTATIVE COLOR E3 | LIGHT GRAY (R, G, B) = (200, 200, 200) | 200 |

FIG.18B

| REPRESENTATIVE COLOR NE | COLOR VALUE | NUMBER OF PIXELS |
|---|---|---|
| REPRESENTATIVE COLOR NE1 | WHITE (R, G, B) = (255, 255, 255) | 10000 |
| REPRESENTATIVE COLOR NE2 | BLACK (R, G, B) = (0, 0, 0) | 500 |
| REPRESENTATIVE COLOR NE3 | GRAY (R, G, B) = (40, 40, 40) | 2000 |

APPARATUS, METHOD, AND STORAGE MEDIUM FOR PERFORMING COLOR REDUCTION PROCESSING

BACKGROUND OF THE DISCLOSURE

Field of the Disclosure

The aspect of the embodiments relates to an image processing apparatus, an image processing method, and a storage medium.

Description of the Related Art

Japanese Patent Application Laid-Open No. 2003-309727 performs color reduction processing on an original image, outputs color information and an index color image, generates a binary image for each color and background color information and performs compression processing using a method such as Modified Modified Read (MMR).

When a document is scanned and image data is generated, an intermediate color may emerge at a character edge portion in the image data due to scan unevenness or the like. In a case where the image is encoded by performing color reduction processing, generating a binary image for each color and performing compression processing using a method such as MMR as discussed in Japanese Patent Application Laid-Open No. 2003-309727, binary images corresponding to different colors are generated for the character portion and the character edge portion. In such a case, the compression efficiency reduces when the binary image is compressed using a method such as MMR.

SUMMARY OF THE DISCLOSURE

According to an aspect of the embodiments, an apparatus includes a reading unit configured to read an image on a document and generate image data, a reduction unit configured to perform color reduction processing for quantizing a color in the generated image data, a change unit configured to change, in a case where brightness of an edge pixel indicating an edge portion in an image based on the image data with the color quantized is equal to or higher than a threshold value, a pixel value of the edge pixel to a pixel value of a color of a pixel having highest brightness among pixels surrounding the edge pixel, and change, in a case where the brightness of the edge pixel is lower than the threshold value, the pixel value of the edge pixel to a pixel value of a color of a pixel having lowest brightness among the pixels surrounding the edge pixel, and a compression unit configured to compress the image data in which the pixel value of the edge pixel is changed while dividing the data color by color.

Further features of the disclosure will become apparent from the following description of exemplary embodiments with reference to the attached drawings.

BRIEF DESCRIPTION OF THE DRAWINGS

FIG. 5 is a flowchart illustrating image processing performed by the data processing unit according to the first exemplary embodiment.

FIG. 8 illustrates an example of the structure of compressed data according to the first exemplary embodiment.

FIGS. 11A and 11B illustrate processing performed by a color information generation unit and a color information sort unit according to the first exemplary embodiments.

FIG. 12A to 12H illustrate image data according to a third exemplary embodiment.

FIGS. 17A to 17D illustrate representative colors according to the third exemplary embodiment.

FIGS. 18A and 18B illustrate representative colors according to a fourth exemplary embodiment.

DESCRIPTION OF THE EMBODIMENTS

In the following description, exemplary embodiments for implementing the disclosure will be described with reference to the drawings.

<Overall System Configuration>

Figure 1:
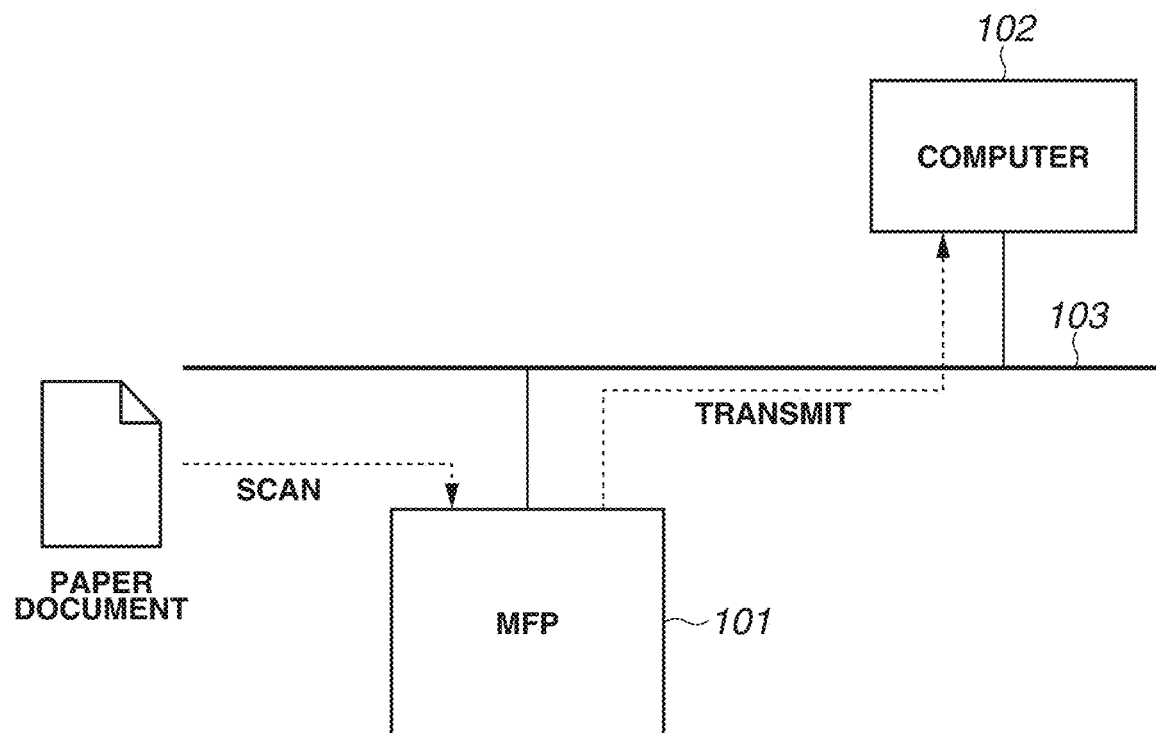
FIG. 1 is a block diagram of an apparatus according to a first exemplary embodiment.

FIG. 1 schematically illustrates the system configuration of a multifunction peripheral (MFP) according to a first exemplary embodiment. In FIG. 1, a MFP 101 and a computer (hereinafter referred to as a personal computer (PC)) 102 are connected via a network 103.

A user can set a destination to which a scanned image is transmitted (for example, the PC 102) and configure various kinds of settings regarding scan and transmission using an operation unit 203 of the MFP 101 in FIG. 2, which will be described below. As these various kinds of settings, the user can specify the resolution, the compression ratio, the data format (for example, Joint Photographic Experts Group (JPEG), Tag Image File Format (TIFF), Portable Document Format (PDF), compression with less colors, compression with less colors (with an optical character recognition (OCR) result attached thereto), and the like. The present exemplary embodiment will be described using an example where the compression with less colors is specified as the data format. The details of the technique for the compression with less colors will be described below. After that, data is generated using the software or hardware function of the MFP 101 based on the various kinds of specified settings, and the generated data is transmitted to the specified destination. At this time, the image transmitted to the PC 102 is transmitted in a file format such as PDF and thus can be viewed on a general-purpose viewer provided in the PC 102.

<System Configuration of MFP>

Figure 2:
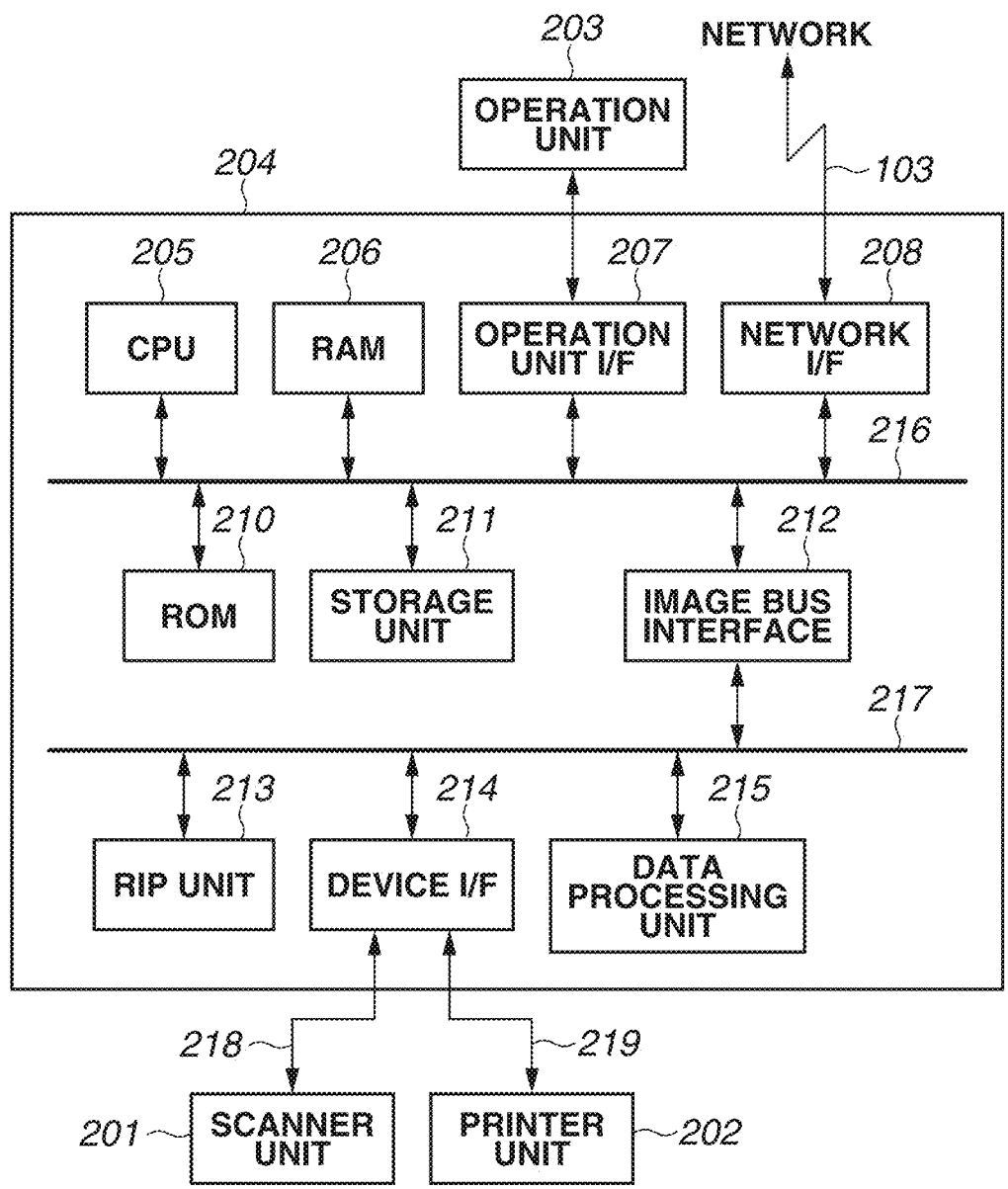
FIG. 2 illustrates a hardware configuration of a multifunction peripheral (MFP) according to the first exemplary embodiment.

FIG. 2 illustrates the detailed configuration of the MFP 101 according to the exemplary embodiment of the disclosure.

The MFP 101 includes a scanner unit 201, a printer unit 202, a control unit 204 and the operation unit 203. The scanner unit 201 is an image input device, the printer unit 202 is an image output device. The control unit 204 includes a memory. The operation unit 203 is a user interface. The control unit 204 is a controller that inputs and outputs image information and device information by being connected to the scanner unit 201, the printer unit 202, the operation unit 203 and the network 103. A central processing unit (CPU) 205 is a processor that controls the entire system. A random access memory (RAM) 206 is a system work memory that allows the CPU 205 to operate, and is also an image memory for temporarily recording image data. A read only memory (ROM) 210 is a boot ROM, and stores a program such as a boot program of the system therein. A storage unit 211 is a hard disk drive, and stores system control software and image data therein. An operation unit interface (I/F) 207 is an interface with the operation unit (user interface (UI)) 203, and outputs image data to be displayed on the operation unit 203 to the operation unit 203. The operation unit I/F 207 also plays a role of transmitting information input by the user of the MFP 101 via the operation unit 203 to the CPU 205. A network I/F 208 connects the MFP 101 to the network 103, and inputs and outputs information in the packet format. These devices are disposed on a system bus 216. An image bus interface 212 is a bus bridge that connects the system bus 216 and an image bus 217, between which image data is transferred at a high speed, and converts a data structure. Examples of the image bus 217 include a Peripheral Component Interconnect (PCI) bus and an Institute of Electrical and Electronics Engineers (IEEE) 1394 cable.

The following devices are disposed on the image bus 217. A raster image processor (RIP) unit 213 realizes rendering processing, which analyzes a Page Description Language (PDL) code and develops it into a bitmap image at a specified resolution. A device I/F unit 214 connects the MFP 101 to the scanner unit 201, which is the image input device, via a signal line 218, and also connects the MFP 101 to the printer unit 202, which is the image output device, via a signal line 219. A data processing unit 215 performs image processing on scanned data input from the scanner unit 201 and data processing on a print image to output to the printer unit 202, and also performs processing such as the compression with less colors and the OCR. By this processing, compressed data 317 (described below) is generated. The generated compressed data 317 is transmitted to a specified destination (for example, the PC 102) via the network I/F 208 and the network 103. Further, this data processing unit 215 can also decompress compressed data received via the network I/F 208 and the network 103. The decompressed data will be transmitted to the printer unit 202 via the device I/F 214 unit and printed thereby. The details of the data processing unit 215 will be described below.

<Description of Data Processing Unit>

Figure 3:
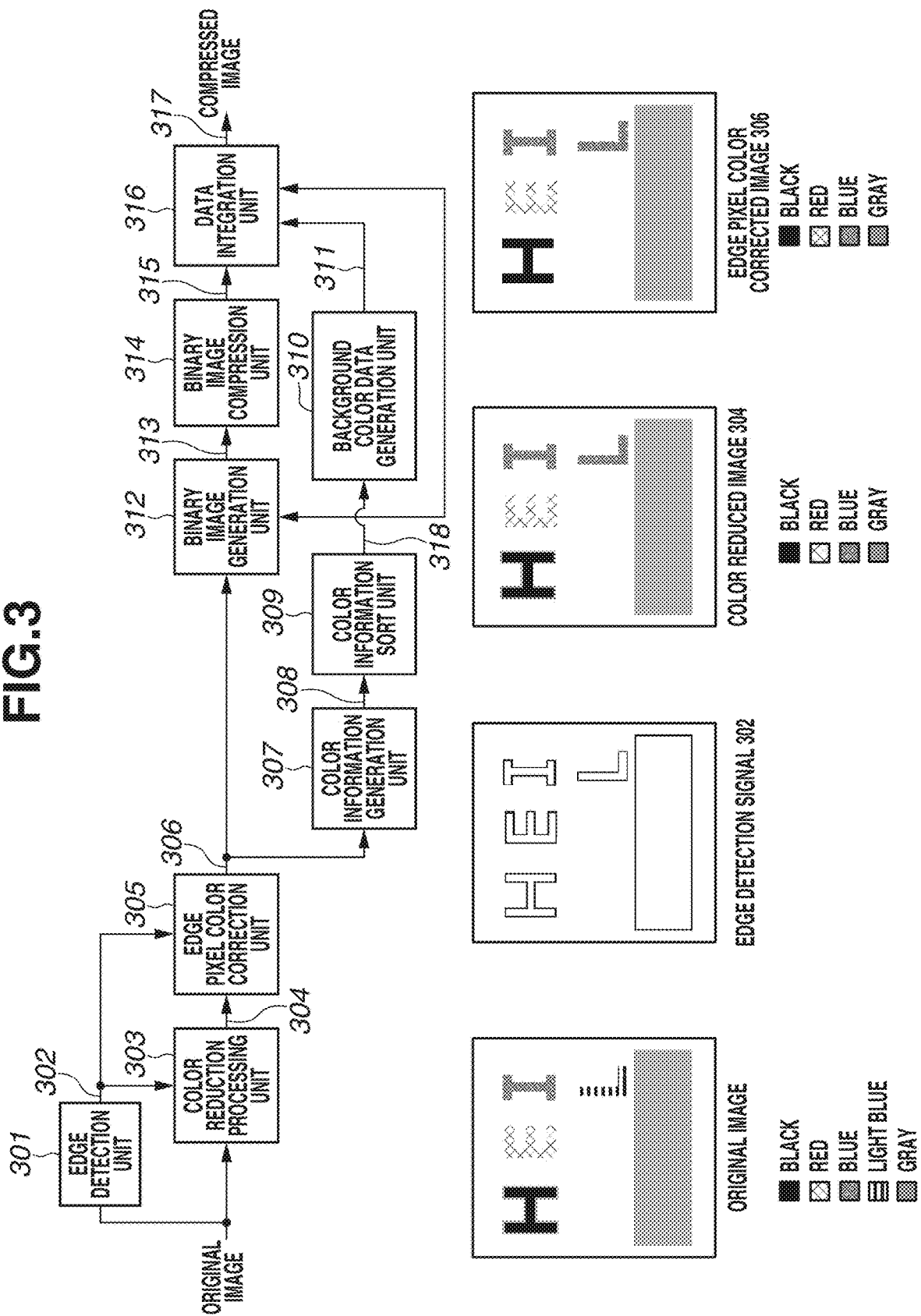
FIG. 3 illustrates the details of a data processing unit according to the first exemplary embodiment.

FIG. 3 illustrates the functional configuration of an image encoding apparatus according to the present exemplary embodiment and also illustrates data to be processed by each unit or data processed by each unit.

An edge detection unit 301 carries out edge detection with respect to each pixel in an original image. A known technique, such as the Laplacian filter and the Canny edge detector, is used as the edge detection method. As a result of the execution of the edge detection processing, an edge detection signal 302 corresponding to each pixel in the original image is generated. The edge detection signal 302 is, for example, a binary image in the same size as the original image, and contains a value of 0 or 1 corresponding to the edge detection result at each pixel in the original image. The value 0 indicates a non-edge pixel, and the value 1 indicates an edge pixel.

A color reduction processing unit 303 performs color reduction processing based on the number of colors predetermined for the original image and the edge detection signal 302. In the present exemplary embodiment, a color reduced image 304 is generated using information about the color of a pixel having 0 as the value of each pixel in the edge detection signal 302 corresponding to each pixel in the original image, i.e., a pixel determined not to be an edge. A value stored in the ROM 210 is used as the predetermined number of colors in the present exemplary embodiment, but the predetermined number of colors is not limited thereto. In the color reduction method, for example, representative colors after the color reduction are determined by selecting the predetermined number of colors from frequently used colors in histograms of red, green, and blue (RGB) values. After that, the colors in all the pixels in the image are reduced to colors closest to the respective representative colors. This is one method exemplified to facilitate the description of the present exemplary embodiment, and the color reduction method is not limited thereto. This color reduction processing is processing for quantizing the colors contained in the image data.

An edge pixel color correction unit 305 changes the pixel value (the color) of the pixel determined to be an edge by the edge detection unit 301 based on pixel values (colors) of pixels surrounding the pixel determined to be an edge. As a result of the execution of the edge pixel color correction processing in this manner, an edge pixel color corrected image 306 is generated. This correction allows a binary image compression unit 314, which will be described below, to improve the compression efficiency and achieve highly reproducible compression. The details of the edge pixel color correction processing will be described below.

A color information generation unit 307, color information 308, and a color information sort unit 309 will be described with reference to FIGS. 11A and 11B.

The color information generation unit 307 generates color information for each of the colors contained in the edge pixel color corrected image 306 generated by the edge pixel color correction unit 305. More specifically, the color information generation unit 307 generates the color information 308 including data indicating the number of pixels having the color, the value of the color, and a distribution range indicating in which range of the entire image the pixels having the color lie like an example illustrated in FIG. 11A. Thus, the color information generation unit 307 generates as many pieces of color information as the number of colors used in the edge pixel color corrected image 306. Assume that the data on the distribution range is data indicating the coordinates of a pixel located at the upper left corner (start coordinates) and the coordinates of a pixel located at the lower right corner (end coordinates) for each of the colors in the edge pixel color corrected image 306.

The color information sort unit 309 sorts the color information 308 based on the number of pixels for each of the colors, thereby generating sorted color information 318 like an example illustrated in FIG. 11B. As a result of the sorting, the color information corresponding to the largest number of pixels is listed at the top in the sorted color information 318.

A background color data generation unit 310 generates the value of the color contained in the color information listed at the top in the sorted color information 318 as background color data 311. The value of the color is assumed to be a value formed by 8 bits for each of RGB in the present exemplary embodiment, but is not limited thereto.

Figure 4:
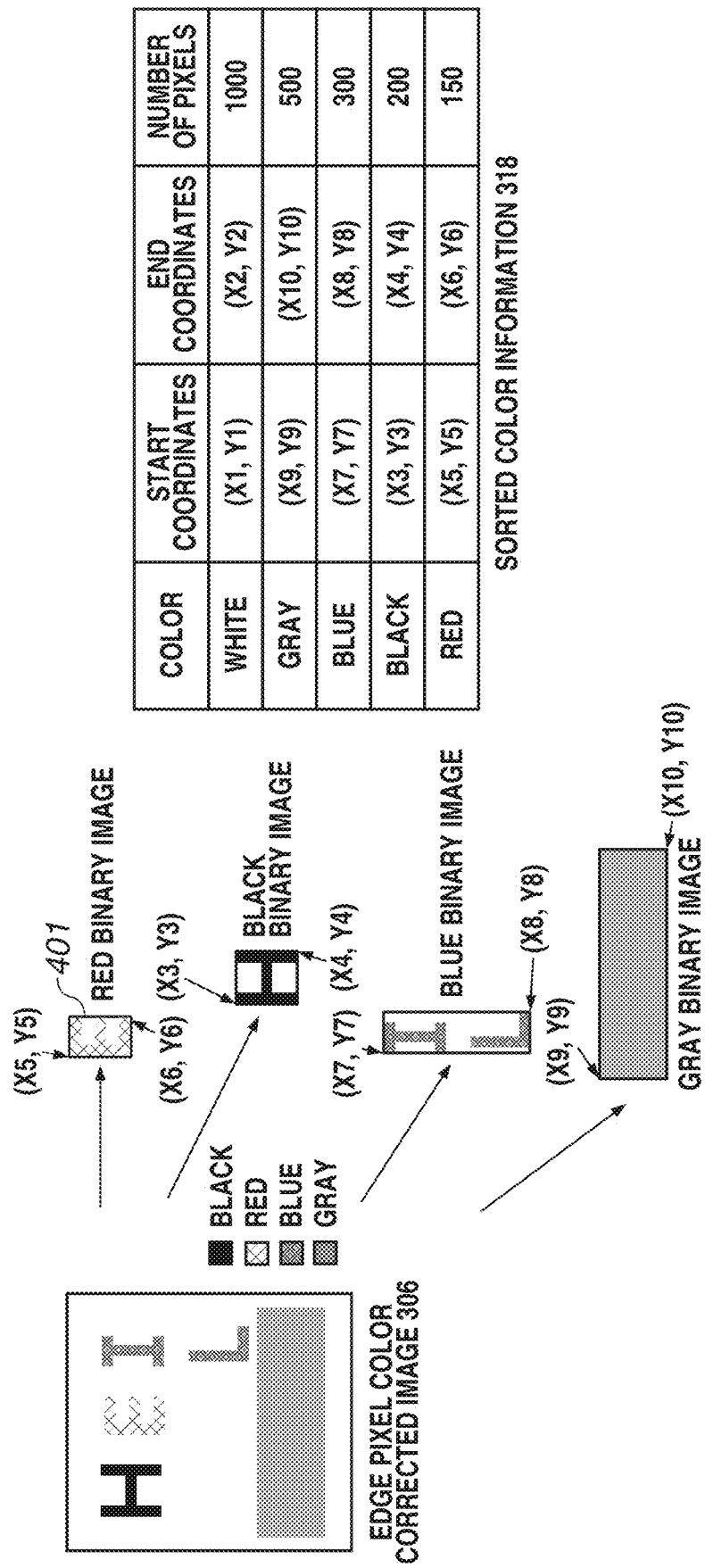
FIG. 4 illustrates processing performed by a binary image generation unit according to the first exemplary embodiment.

A binary image generation unit 312 will be described with reference to FIG. 4.

The binary image generation unit 312 generates a binary image 313 by dividing the edge pixel color corrected image 306 color by color based on the sorted color information 318. In the present exemplary embodiment, the binary image generation unit 312 generates the binary image 313 for each of the colors except for the top color (white in the description of the present exemplary embodiment) in the sorted color information 318. For example, in a case where the value of the color contained in the color information is red as indicated by a red binary image 401 in FIG. 4, the binary image 313 is set to an image size defined by the upper left vertex and the lower right vertex of the binary image 313 placed at the coordinates of the pixel located at the upper left corner and the coordinates of the pixel located at the lower right corner, respectively, included in this color information in the edge pixel color corrected image 306. Then, the binary image 313 is generated by assigning 1 to a pixel having the same color as this color and otherwise assigning 0, and data indicating this color is added thereto.

The binary image compression unit 314 compresses the binary image 313 generated for each of the colors by the binary image generation unit 312, thereby generating binary image compressed data 315. The Modified Modified Read (MMR) compression method is employed in the present exemplary embodiment, but the compression method is not limited thereto. A data integration unit 316 integrates the background color data 311, the binary image compressed data 315, and the sorted color information 318, thereby generating the compressed data 317.

<Description of Flowchart>

Image encoding processing performed by the image encoding apparatus according to the present exemplary embodiment configured in the above-described manner will be described with reference to FIG. 5. FIG. 5 is a flowchart of the image encoding processing performed by the image encoding apparatus according to the present exemplary embodiment. The description of each step in FIG. 5 is a description about the processing content of each processing unit based on an instruction from the CPU 205.

When the user specifies the compression with less colors using the operation unit 203 in FIG. 2 of the MFP 101 in FIG. 1, the operation unit I/F 207 notifies the CPU 205 of the data format specified by the user. The CPU 205 issues an instruction to read a document by the scanner unit 201 based on information about the notification from the operation unit I/F 207, and also issues an instruction to start the processing on the input image data to the data processing unit 215. Upon receipt of the instruction to start the processing, in step S501, the edge detection unit 301 performs the edge detection processing on the input image, thereby generating the edge detection signal 302. Regarding the detection method, the known technique is used as described above.

Next, in step S502, the color reduction processing unit 303 performs the color reduction processing on the input image using the color information of the pixel having 0 as the value in the edge detection signal 302 (the non-edge pixel) and then generates the color reduced image 304. The above-described method is used regarding the generation method.

<Description of Technique Proposed By Present Exemplary Embodiment>

Next, the edge pixel color correction processing performed by the edge pixel color correction unit 305 in step S503 will be described with reference to FIGS. 6A to 6C and 7.

Figure 6A:
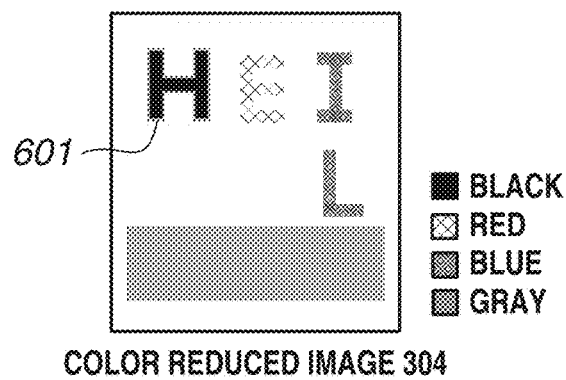
FIGS. 6A, 6B, and 6C illustrate the details of processing performed in step S503 according to the first exemplary embodiment.
Figure 6B:
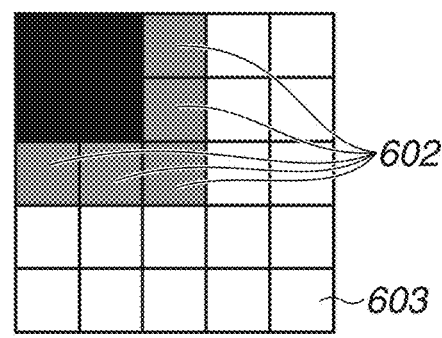

First, FIG. 6A illustrates the color reduced image 304 as a result of the execution of the processing by the color reduction processing unit 303. FIG. 6B is an enlarged view of the lower right portion of a black character 601 in FIG. 6A. As indicated by pixels 602 in FIG. 6B, the lower right portion of the black character 601 may be subjected to color reduction to be represented by an intermediate color between the color of pixels forming the black character 601 and the color of a background 603 due to, for example, reading unevenness when a paper document is scanned when the original image is generated. This results in reductions in the compression efficiency and the reproducibility of the document information when the binary image generation unit 312 in FIG. 3 generates the binary image 313 for each of the colors. Thus the present exemplary embodiment allows the MFP 101 to improve the compression efficiency along with improving the reproducibility of the document information by correcting the color of the edge pixel in the color reduced image 304 into the color of the character portion or the color of the background according to the brightness of this edge pixel.

Figure 7:
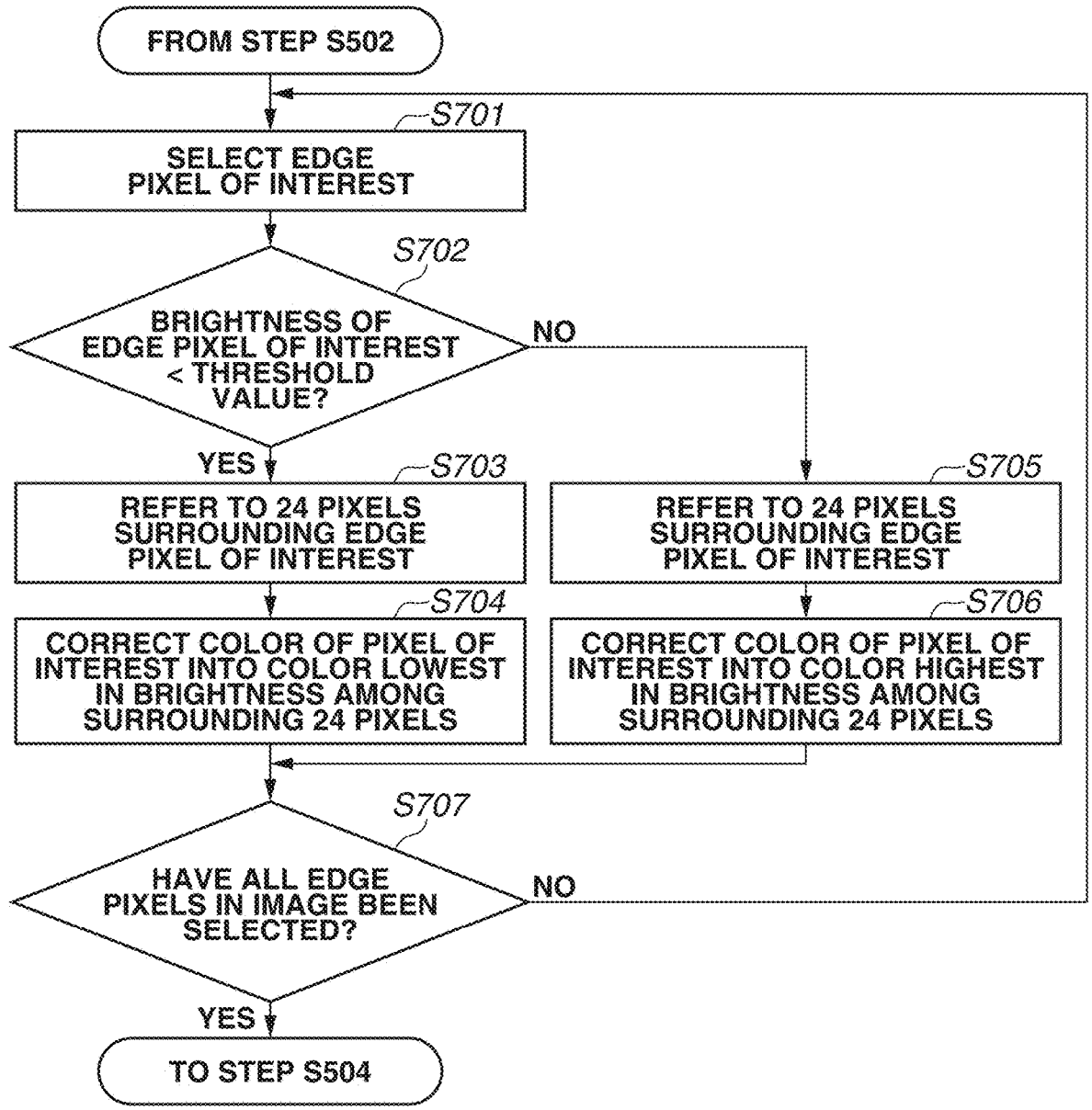
FIG. 7 is a flowchart illustrating the details of the processing performed in step S503 according to the first exemplary embodiment.

FIG. 7 illustrates a flowchart indicating the details of the above-described processing in step S503. The description of each step in FIG. 7 is a description about the processing content of each processing unit based on an instruction from the CPU 205.

Figure 6C:
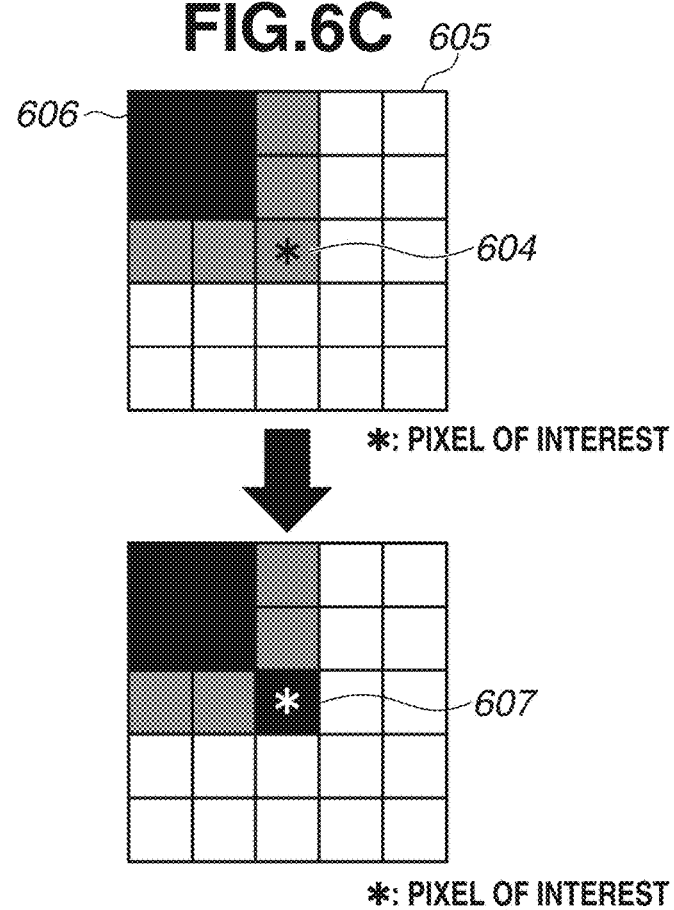

First, in step S701, the edge pixel color correction unit 305 selects a pixel to which 1 has been assigned as the value in the edge detection signal 302 (the edge pixel) in the input image in step S501 in FIG. 5 as a pixel of interest. In the present exemplary embodiment, this processing will be described assuming that a pixel 604 in FIG. 6C is selected as the pixel of interest. The order of selecting the pixel of interest in the image may be any order, and is assumed to follow the order of raster scan in the entire image in the present exemplary embodiment.

Next, in step S702, the edge pixel color correction unit 305 determines whether the value of the brightness of the pixel of interest is lower than a threshold value. The edge pixel color correction unit 305 makes the determination based on the average value of the respective values of RGB in the present exemplary embodiment, but the determination method is not limited thereto. For example, the edge pixel color correction unit 305 may use the Y component in the YCbCr color space constituted by brightness and color differences or may use the L* component in the L*a*b* color space. If the value of the brightness of the pixel of interest is lower than the threshold value (YES in step S702), the processing proceeds to step S703. If the value of the brightness of the pixel of interest is equal to or higher than the threshold value (NO in step S702), the processing proceeds to step S705.

Next, in step S703, the edge pixel color correction unit 305 selects 5×5 pixels vertically and horizontally arranged around the pixel of interest as reference pixels. Assume that the reference pixels arranged around the pixel of interest 604 include white, gray, and black pixels as indicated by pixels 605 in the description of the present exemplary embodiment. Assume that the RGB values of white, black, and gray are (255, 255, 255), (0, 0, 0), and (128, 128, 128), respectively.

Next, in step S704, the edge pixel color correction unit 305 selects a pixel at which the brightness has the lowest value among the 24 pixels excluding the pixel of interest from the vertically and horizontally arranged 5×5 pixels selected in step S703, and corrects the color of the pixel of interest into the color of the selected pixel at which the brightness has the lowest value. Black pixels 606 are the pixels at which the brightness has the lowest value among the reference pixels 605 described in the present exemplary embodiment, and the color of the pixel of interest is corrected as indicated by a pixel 607 in FIG. 6C.

Next, in step S705, the edge pixel color correction unit 305 selects the 5×5 pixels vertically and horizontally arranged around the pixel of interest as the reference pixels similarly to step S703.

Next, in step S706, the edge pixel color correction unit 305 selects a pixel at which the brightness has the highest value among the 24 pixels excluding the pixel of interest from the vertically and horizontally arranged 5×5 pixels selected in step S705, and corrects the color of the pixel of interest into the color of the selected pixel at which the brightness has the highest value.

Next, in step S707, the edge pixel color correction unit 305 determines whether all the edge pixels have been selected. If all the edge pixels have been selected and the colors of the edge pixels have been corrected (YES in step S707), the processing proceeds to step S504. If not (NO in step S707), the processing returns to step S701. The detailed description of step S503 is ended here. As a result of the processing by the edge pixel color correction unit 305 in the flowchart of FIG. 7, the edge pixel color corrected image 306 is generated.

Next, in step S504, the color information generation unit 307 in FIG. 3 generates the color information 308 based on the edge pixel color corrected image 306. As described above, the color information 308 includes the data indicating the color contained in the edge pixel color corrected image 306, the number of pixels for each of the colors to which the original colors are reduced, and the data indicating the coordinates of the pixel located at the uppermost and leftmost position and the coordinates of the pixel located at the lowermost and rightmost position in the edge pixel color corrected image 306.

Next, in step S505, the color information sort unit 309 sorts the color information 308 based on the number of pixels for each of the colors, thereby generating the sorted color information 318. As a result of the sorting, the color information of the color corresponding to the largest number of pixels is listed at the top.

Next, in step S506, the background color data generation unit 310 outputs the value of the top color in the sorted color information 318 as the background color data 311.

Next, in step S507, the binary image generation unit 312 generates the binary image 313 for each of the colors using the color information 308 except for the color information listed at the top and the edge pixel color corrected image 306. The above-described generation method is used in the processing in this step.

Next, in step S508, the binary image compression unit 314 performs the compression processing on the binary image 313 for each of the colors using a method such as MMR, thereby generating the binary image compressed data 315. The binary image compressed data 315 is a data group including the color information and the MMR compressed data.

Then in step S509, the data integration unit 316 integrates the background color data 311, the binary image compressed data 315, and the sorted color information 318, thereby generating the compressed data 317. The data integration unit 316 then outputs the generated compressed data 317. FIG. 8 illustrates an example of the structure of the compressed data 317.

First, information such as the size (the number of pixels in the vertical and horizontal directions) of the input document image (the original image), the color value of the background color, and the resolution is input in the header portion. Because the color corresponding to the largest number of pixels is basically selected as the background color, for example, a value of a red or similar color is input when the document is printed on color paper such as red paper. However, it is considered that the document has a white base in most cases, and thus it may be determined whether the background color is white and the value of the background color may be omitted if the background color is determined to be white. For the determination about whether the background color is white, for example, the background color is determined to be white if the respective values of RGB are equal to or greater than a predetermined value and a difference between the respective values is equal to or smaller than a predetermined value.

The header portion is followed by the compressed data for each of the colors next thereto. The compressed data includes the color information and the MMR compressed data as described above. If the number of remaining colors excluding the background color is N, the compressed data 317 contains as many pieces of identically structured data as the number N of colors. In a case where the input image is a single-color document such as blank paper, no data is generated for this portion. In a case where the document is monochrome, the compressed data 317 contains a single pieces of color compressed data, and this becomes approximately equivalent to a binary image. If black pixels are contained only in a part of the document, only this portion is compressed as the MMR compressed data, and thus the compressed data 317 has a smaller data size than when the entire monochrome document is compressed using MMR.

As the method for decoding this compressed data 317 into the original image, the entire region in the document is drawn in the background color stored in the header portion illustrated in FIG. 8 and the MMR compressed data contained in the compressed data 317 is decompressed in the stored order. The compressed data 317 is decoded by overwriting the data based on the position and color stored when the drawn image is used as a mask.

As described above, the image encoding apparatus and the image encoding method according to the present exemplary embodiment can efficiently compress most color document images by having the binary image for each color.

Next, a second exemplary embodiment will be described. Another configuration of the edge pixel color correction unit 305 in FIG. 3 will be described with reference to FIGS. 9A to 9E and 10.

Figure 9A:
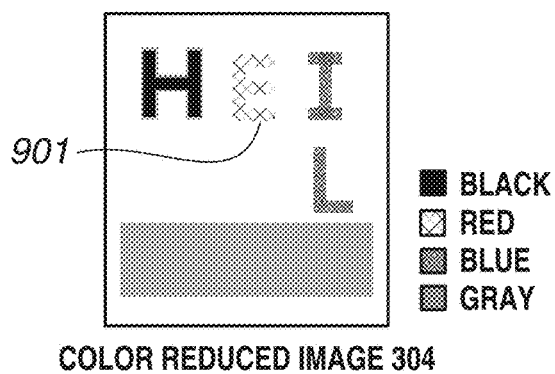
FIGS. 9A to 9E illustrate the details of processing performed by an edge pixel color correction unit according to a second exemplary embodiment.
Figure 9B:
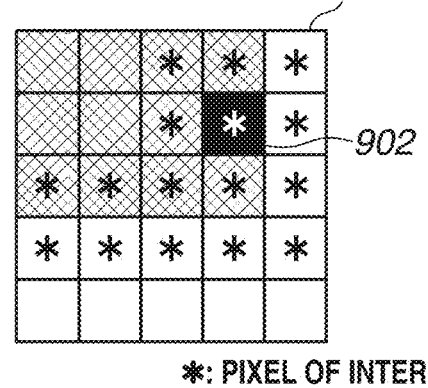
Figure 9C:
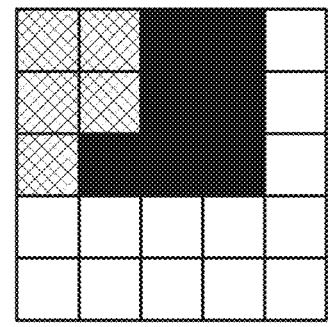

When the processing by the color reduction processing unit 303 in FIG. 3 is ended, an isolated point 902 in a different color from the surrounding pixels as described in FIG. 9B is generated at the character edge portion of a red character 901 in an image like an example in FIG. 9A due to, for example, unevenness in the readout of the paper document. If the colors of the edge pixels illustrated in FIG. 9B are corrected in step S704 in FIG. 7 when such a pixel is contained in the image, a loss of the information on the original paper document may occur. This is because a pixel at which the brightness is low is selected form the reference pixels and the edge pixels are corrected into this color, which means that the edge pixels are corrected into the color of the isolated point 902 as illustrated in FIG. 9C. Further, a similar phenomenon also occurs in step S706 in FIG. 7 if the background color has low brightness and the isolated point has high brightness.

Figure 10:
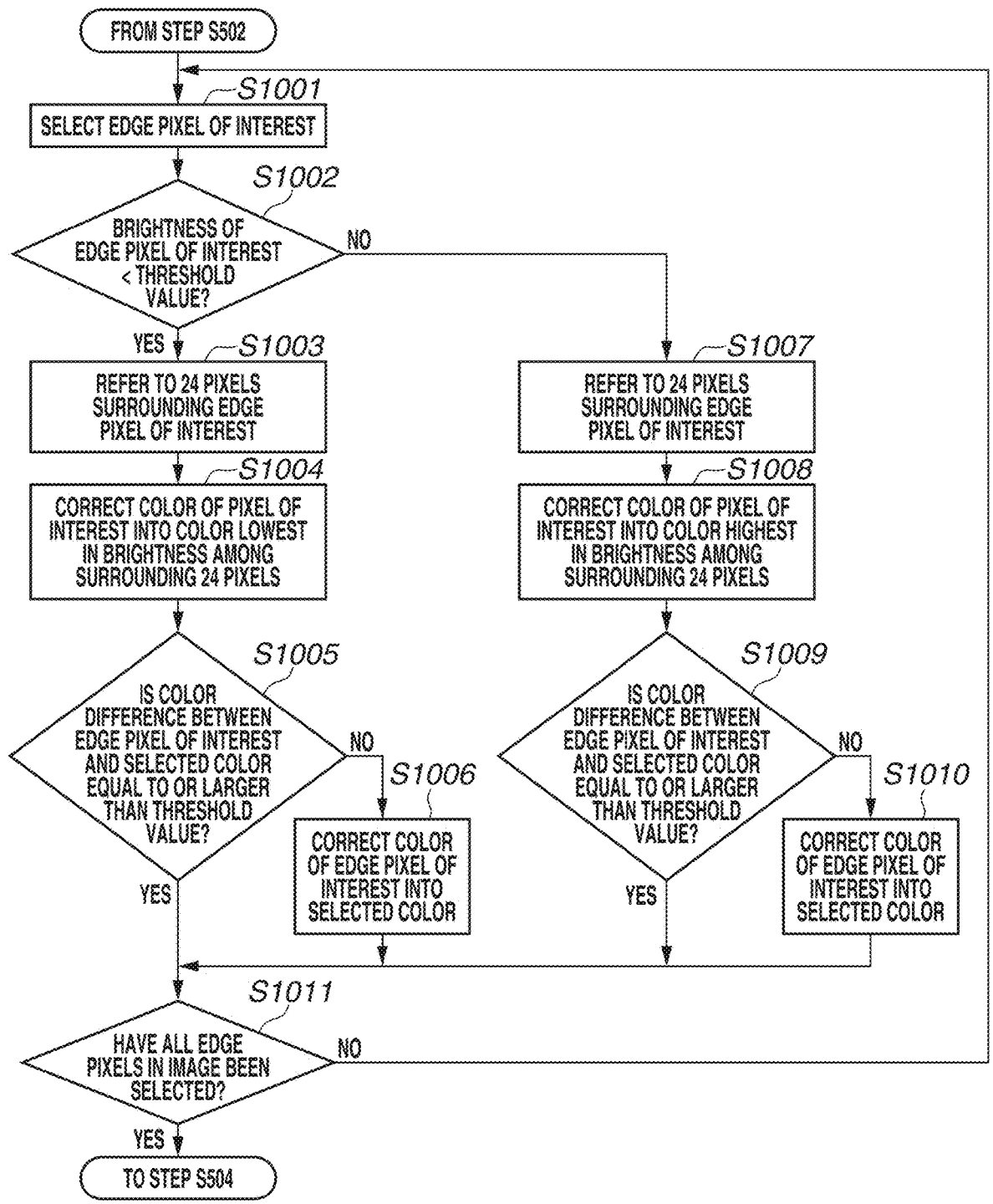
FIG. 10 is a flowchart illustrating the details of the processing performed by the edge pixel color correction unit according to the second exemplary embodiment.

The configuration of the edge pixel color correction unit 305 for solving the above-described issue will be described with reference to FIG. 10. The description of each step in FIG. 10 is a description about the processing content of each processing unit based on an instruction from the CPU 205.

Figure 9D:
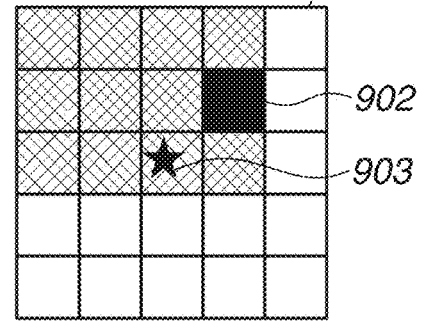
Figure 9E:
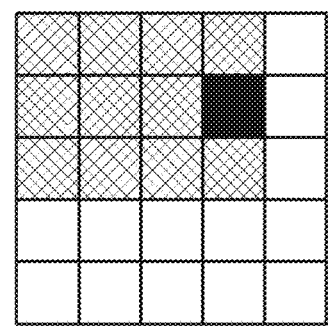

Similar processing to steps S701 to S703 in FIG. 7 is performed in steps S1001 to S1003. Assume that a pixel 903 in FIG. 9D is selected as the pixel of interest and reference pixels 904 include white, black, and red pixels in the present exemplary embodiment. Assume that the RGB values of white, black, and red are (255, 255, 255), (0, 0, 0), and (255, 0, 0), respectively.

In step S1004, the edge pixel color correction unit 305 selects a color lowest in brightness among the 24 pixels referred to in step S1003. Assume that the isolated point 902 is selected in the description of the present exemplary embodiment.

In step S1005, the edge pixel color correction unit 305 calculates a color difference between the color selected in step S1004 and the edge pixel of interest, and determines whether the color difference is equal to or larger than a threshold value. As the method for calculating the color difference, the color difference is calculated as a sum of the differences in the respective components in the RGB values between the pixel of interest and the color selected in step S1004. However, this is an example, and the method for calculating the color difference is not limited to this calculation method. For example, the differences in the values of the Cb component and the Cr component in the YCbCr color space may be used.

If the color difference is equal to or larger than the threshold value (YES in step S1005), the processing proceeds to step S1011. If the color difference is smaller than the threshold value (NO in step S1005), the processing proceeds to step S1006.

In step S1006, the edge pixel color correction unit 305 corrects the edge pixel of interest into the color selected in step S1004.

In step S1007, the edge pixel color correction unit 305 performs similar processing to step S705.

In step S1008, the edge pixel color correction unit 305 selects a color highest in brightness among the 24 pixels referred to in step S1007.

In step S1009, the edge pixel color correction unit 305 calculates the color difference using a similar method to step S1005.

If the color difference is equal to or larger than a threshold value (YES in step S1009), the processing proceeds to step S1011. If the color difference is smaller than the threshold value (NO in step S1009), the processing proceeds to step S1010.

In step S1010, the edge pixel color correction unit 305 corrects the edge pixel of interest into the color selected in step S1008.

In step S1011, the edge pixel color correction unit 305 performs similar processing to step S707. The description of the flowchart of FIG. 10 is ended here.

As a result of the above-described processing, the MFP 101 can keep the degradation of the image quality caused by, for example, scan unevenness like the isolated point 902 to a minimum as illustrated in FIG. 9D. This allows the MFP 101 to prevent a loss in the character information and the photography information.

In the following description, a third exemplary embodiment will be described. The first and second exemplary embodiments have been described using an example where the color reduction processing unit 303 in FIG. 3 generates the color reduced image 304 using the information about the color of the pixel having 0 as the value of each pixel in the edge detection signal 302, i.e., the pixel determined not to be an edge. However, reducing the colors using the information about the color of the pixel determined not to be an edge may lead to a failure to reproduce the color of a character written in a small point size or a thin line formed by edge pixels.

For example, the failure to reproduce the color of a character written in a small point size will be described with reference to FIGS. 12A to 12H.

FIG. 12A illustrates an example of an original image according to the present exemplary embodiment, and illustrates an image containing a black character "H", a red character "E" written in a small point size, and a gray graphic.

FIG. 12B illustrates an edge detection signal acquired from the edge detection unit 301 based on the original image in FIG. 12A fed as an input thereto. As illustrated in FIG. 12B, portions drawn in "black" indicate edge pixels, and the red character "E" written in a small point size is formed by edge pixels. This raises such an issue that reducing the colors using the information about the color of the pixel determined not to be an edge leads to a failure to reproduce the red color.

The present exemplary embodiment will be described regarding a method for achieving efficient compression while keeping even the color of a character written in a small point size or a thin line reproducible by an appropriate color by extracting a representative color for each of the color information of the pixels determined not to be an edge and the color information of the pixels determined to be an edge.

In the present exemplary embodiment, components and steps that are similar to those described in the first exemplary embodiment will be given the same reference numerals, and the description thereof will be omitted.

<Description of Data Processing Unit>

Figure 13:
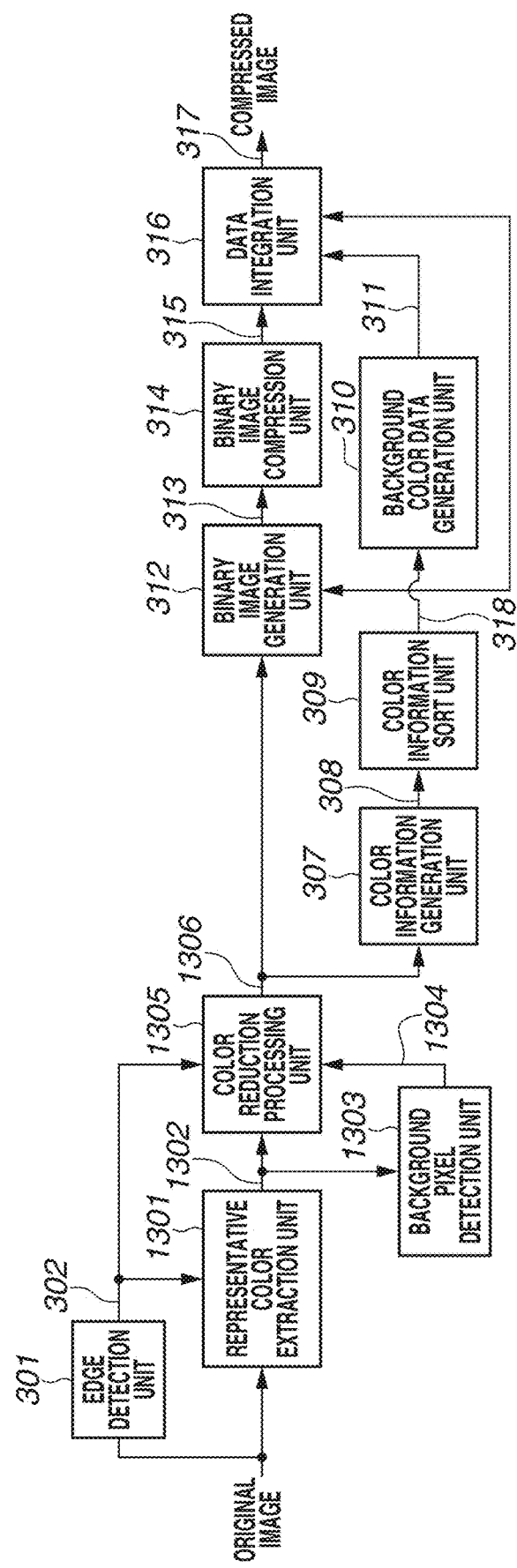
FIG. 13 illustrates the details of a data processing unit according to the third exemplary embodiment.

Next, FIG. 13 illustrates the functional configuration of an image encoding apparatus according to the present exemplary embodiment and also illustrates data to be processed by each unit or data processed by each unit.

In FIG. 13, processing units 301, 302, and 307 to 318 are similar to the processing units in the first exemplary embodiment, so that the descriptions thereof will be omitted herein. Further, the original image will be described with reference to FIG. 12A.

First, a representative color extraction unit 1301 extracts the representative colors of the edge pixels and the non-edge pixels. The representative color extraction unit 1301 receives the original image and the edge detection signal 302 as inputs, and extracts a representative color E from a histogram of the edge pixels and a representative color NE from a histogram of the non-edge pixels.

Representative colors 1302 include the representative color E of the edge pixels and the representative color NE of the non-edge pixels, and will be described with reference to FIGS. 17A to 17D. FIG. 17A illustrates the representative color E extracted from the edge pixels and FIG. 17B illustrates the representative color NE extracted from the non-edge pixels in the case where the original image is the image illustrated in FIG. 12A. Here, the representative colors E1 to E3 in FIG. 17A are formed by color values and the numbers of pixels like examples illustrated in FIG. 17C. The representative colors NE1 to NE3 in FIG. 17B are formed by color values and the numbers of pixels like examples illustrated in FIG. 17D.

A background pixel detection unit 1303 sets pixels formed by the representative color corresponding to the largest number of pixels among the representative colors 1302 of the edge pixels and the non-edge pixels as the background pixels, and outputs a background pixel signal 1304. In the case where the original image is the image illustrated in FIG. 12A, the representative color corresponding to the largest number of pixels is white, which is the representative color NE1 illustrated in FIG. 17D. Thus, white pixels are set as the background pixels.

FIG. 12C illustrates the background pixel signal 1304. The background pixel signal 1304 is a binary image having the same size as the original image, and contains a value of 0 or 1 in correspondence with the background pixel detection result of each pixel in the original image. The value 0 indicates a non-background pixel, and the value 1 indicates a background pixel.

A color reduction processing unit 1305 inputs the edge detection signal 302, the representative colors 1302 of the edge pixels and the non-edge pixels, and the background pixel signal 1304, and generates a color reduced image.

Now, the details of the color reduction processing according to the present exemplary embodiment will be described with reference to FIGS. 12D, 12E, and 12F.

FIG. 12D illustrates a signal acquired by combining the edge detection signal 302 and the background pixel signal 1304 in the case where the original image is the image illustrated in FIG. 12A. As illustrated in FIG. 12D, referring to the edge detection signal 302 and the background pixel signal 1304 reveals that each pixel is any of an edge pixel, a non-background pixel, and a background pixel.

Next, the color reduction processing will be described regarding each of the processing to be performed when the pixel of interest is a non-edge pixel and the processing when the pixel of interest is an edge pixel.

The present exemplary embodiment will be described assuming that a reference region is 5×5 pixels vertically and horizontally arranged around the pixel of interest, but the reference region is not limited thereto and may be set to 7×7 pixels or 9×9 pixels.

First, FIG. 12E illustrates an example when the pixel of interest is a non-edge pixel. FIG. 12E is an enlarged view of the non-edge portion of the character "H". In this case, the color reduction processing is performed using the representative color NE closest to the color of the pixel of interest. In the case where the original image is the image illustrated in FIG. 12A, the color reduction processing is performed using the representative color NE2, i.e., black.

Next, FIG. 12F illustrates an example when the pixel of interest is an edge pixel and a non-background pixel is placed near the pixel of interest. FIG. 12F is an enlarged view of the edge portion of the character "H". In this case, the color reduction processing is performed using the same color as the non-background pixel placed near the pixel of interest. In the case where the original image is the image illustrated in FIG. 12A, the color of the non-background pixel placed near the pixel of interest is the representative color NE2, and thus the color reduction processing is performed using the same color as the representative color NE2. This allows the edge portion of the character and the non-edge portion of the character to have the same color in a similar manner to the first exemplary embodiment, thereby allowing the MFP 101 to achieve efficient compression.

Next, FIG. 12G illustrates an example when the pixel of interest is an edge pixel and no non-background pixel is placed near the pixel of interest. FIG. 12G is an enlarged view of the edge portion of the character "E" written in a small point size. In this case, the color reduction processing is performed using the representative color E closest to the color of the pixel of interest. In the case where the original image is the image illustrated in FIG. 12A, the color reduction processing is performed using the representative color E1, i.e., red.

FIG. 12H illustrates the result of performing the color reduction processing in this manner The present processing can reduce the colors in such a manner that the edge portion of the character and the non-edge portion of the character have the same color, thereby allowing the MFP 101 to achieve efficient compression and also appropriately extract even the color of a character written in a small point size. Further, the present processing also allows the MFP 101 to appropriately extract the color of a thin line formed by edge pixels similarly to a character written in a small point size.

<Description of Flowchart>

Figure 14:
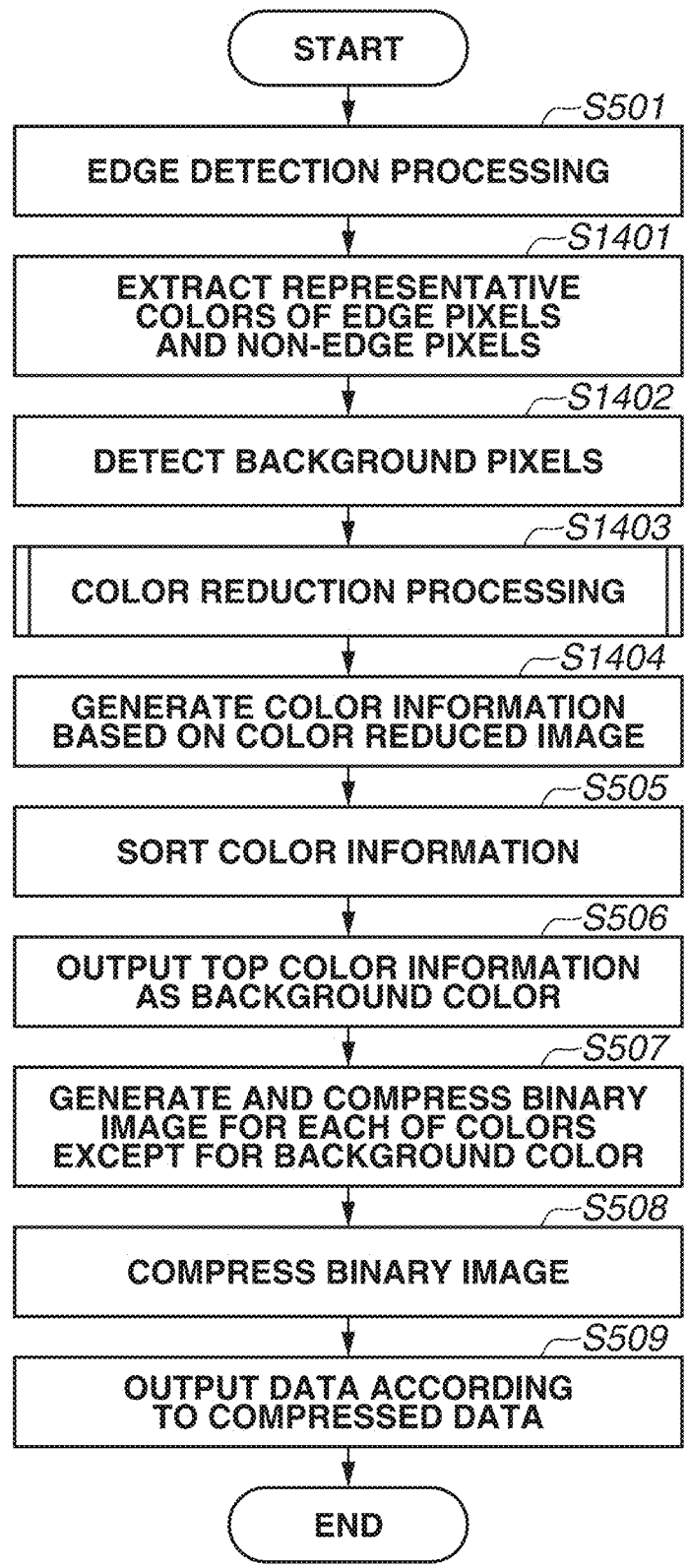
FIG. 14 is a flowchart illustrating image processing performed by the data processing unit according to the third exemplary embodiment.

The image encoding processing performed by the image encoding apparatus according to the present exemplary embodiment configured in the above-described manner will be described with reference to FIG. 14. FIG. 14 is a flowchart of the image encoding processing performed by the image encoding apparatus according to the present exemplary embodiment. The description of each step in FIG. 14 is a description about the processing content of each processing unit based on an instruction from the CPU 205.

In FIG. 14, step S501 and steps S505 to S509 are similar to the processing in the first exemplary embodiment, and so that the descriptions thereof will be omitted herein.

When the user specifies the compression with less colors using the operation unit 203 illustrated in FIG. 2 of the MFP 101 illustrated in FIG. 1, the operation unit I/F 207 notifies the CPU 205 of the data format specified by the user. The CPU 205 issues an instruction to read a document by the scanner unit 201 based on information about the notification from the operation unit I/F 207, and also issues an instruction to start the processing on the input image data to the data processing unit 215. Upon receipt of the instruction to start the processing, in step S501, the edge detection unit 301 performs the edge detection processing on the input image, thereby generating the edge detection signal 302. Regarding the detection method, the known technique is used as described above.

Next, in step S1401, the representative color extraction unit 1301 receives the original image and the edge detection signal 302 as inputs, and extracts the representative color E from the histogram of the edge pixels and the representative color NE from the histogram of the non-edge pixels.

As described above, in the case where the original image is the image illustrated in FIG. 12A, the representative color E and the representative color NE are extracted as indicated by the results illustrated in FIGS. 17C and 17D.

Figure 15:
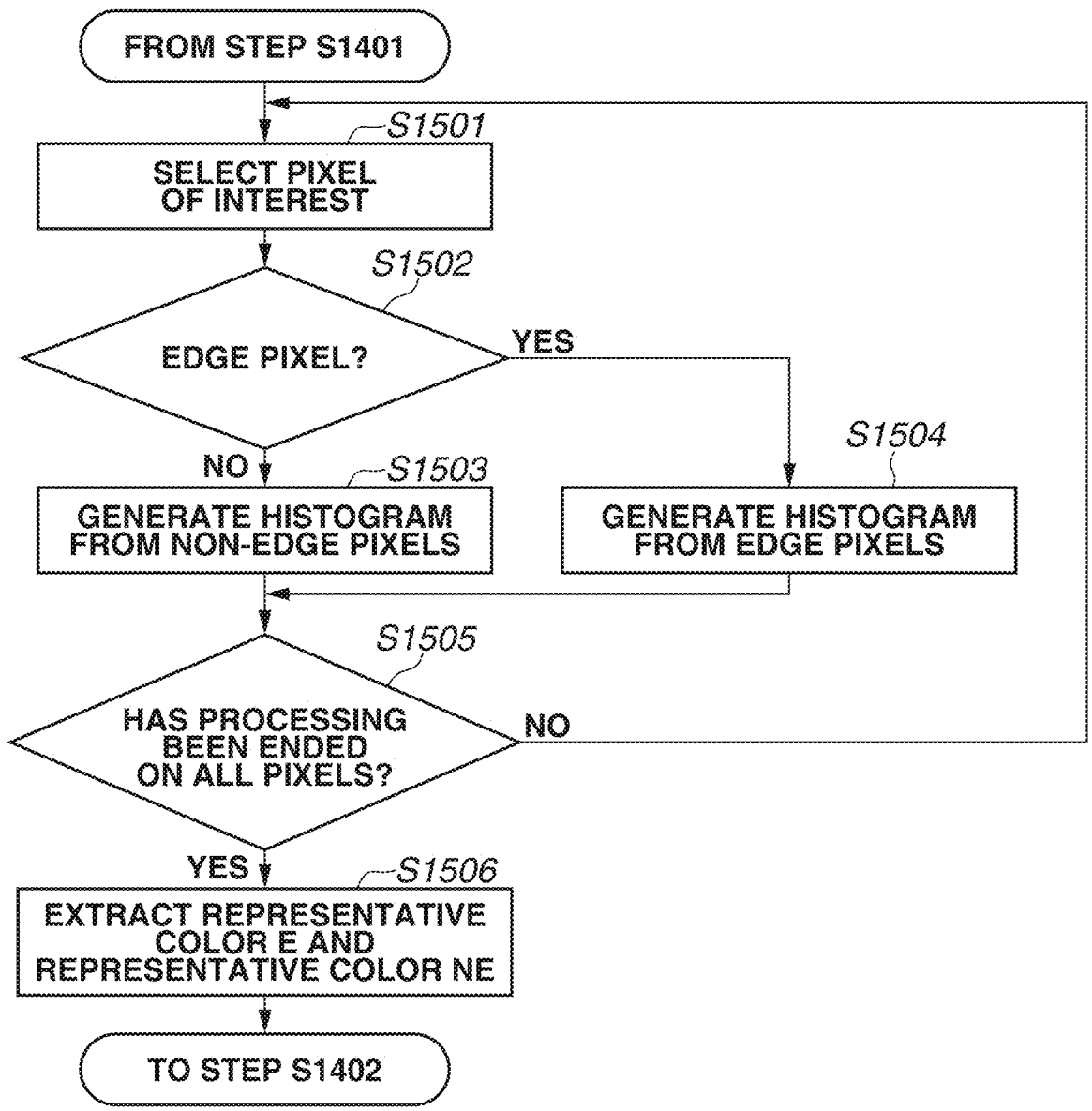
FIG. 15 is a flowchart illustrating the details of processing performed in step S1401 according to the third exemplary embodiment.

Next, the extraction of the representative colors of the edge pixels and the non-edge pixels that is carried out by the representative color extraction unit 1301 in step S1401 will be described with reference to a flowchart in FIG. 15. The description of each step in FIG. 15 is a description about the processing content of each processing unit based on an instruction from the CPU 205.

First, in step S1501, the representative color extraction unit 1301 selects the pixel of interest in the input image. In the present exemplary embodiment, the pixel of interest is selected in the order of raster scan in the entire image similarly to the first exemplary embodiment.

Next, in step S1502, the representative color extraction unit 1301 refers to the edge detection signal 302 corresponding to the pixel selected in step S1501, and determines whether the pixel of interest is an edge pixel. If the pixel of interest is an edge pixel (YES in step S1502), then in step S1504, the representative color extraction unit 1301 generates the histogram from the edge pixels. If the pixel of interest is not an edge pixel (NO in step S1502), then in step S1503, the representative color extraction unit 1301 generates the histogram from the non-edge pixels.

Next, in step S1505, the representative color extraction unit 1301 determines whether the processing has been ended on all the pixels. If the processing has not been ended (NO in step S1505), the processing returns to step S1501. If the processing has been ended (YES in step S1505), the processing proceeds to step S1506.

Next, in step S1506, the representative color extraction unit 1301 extracts the representative colors based on the histogram from the edge pixels generated in step S1504 and the histogram from the non-edge pixels generated in step S1503. As a result, the representative color E and the representative color NE can be acquired.

In this manner, the representative colors of the edge pixels and the non-edge pixels are extracted in step S1401.

Next, in step S1402, the background pixel detection unit 1303 sets pixels formed by the representative color corresponding to the largest number of pixels among the representative colors 1302 of the edge pixels and the non-edge pixels as the background pixels, and outputs the background pixel signal 1304.

Next, in step S1403, the color reduction processing unit 1305 inputs the edge detection signal 302, the representative colors 1302 of the edge pixels and the non-edge pixels, and the background pixel signal 1304, and generates the color reduced image.

Figure 16:
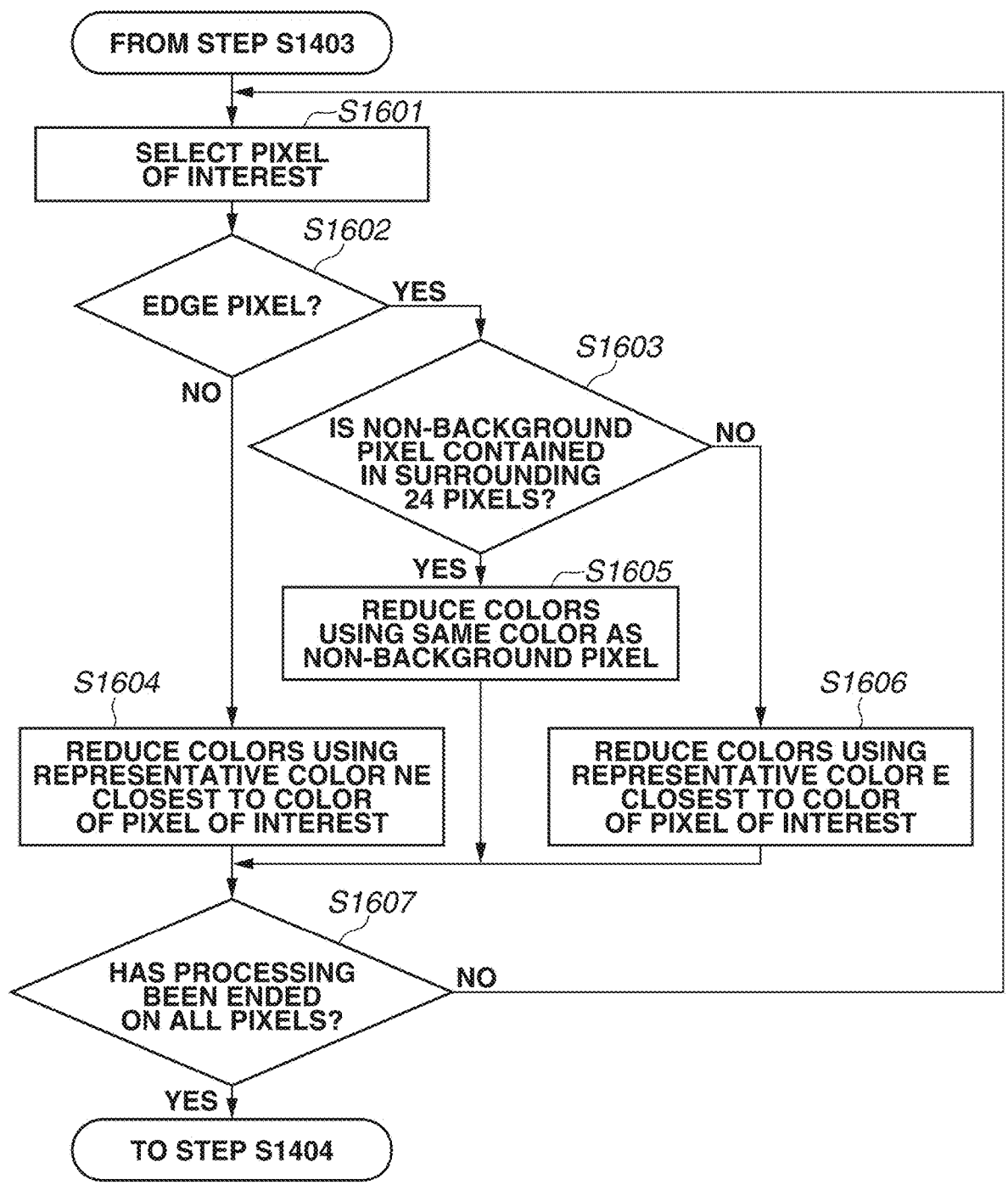
FIG. 16 is a flowchart illustrating the details of processing performed in step S1403 according to the third exemplary embodiment.

Now, the color reduction processing performed by the color reduction processing unit 1305 in step S1403 will be described with reference to a flowchart in FIG. 16. The description of each step in FIG. 16 is a description about the processing content of each processing unit based on an instruction from the CPU 205.

First, in step S1601, the color reduction processing unit 1305 selects the pixel of interest in the input image. In the present exemplary embodiment, the pixel of interest is selected in the order of raster scan in the entire image similarly to the first exemplary embodiment.

Next, in step S1602, the color reduction processing unit 1305 refers to the edge detection signal 302 corresponding to the pixel selected in step S1601, and determines whether the pixel of interest is an edge pixel.

If the pixel of interest is not an edge pixel, i.e., is a non-edge pixel (NO in step S1602), then in step S1604, the color reduction processing unit 1305 performs the color reduction processing using the representative color NE closest to the color of the pixel of interest.

If the pixel of interest is an edge pixel (YES in step S1602), then in step S1603, the color reduction processing unit 1305 determines whether a non-background pixel is contained in the surrounding 24 pixels that are the 5×5 pixels vertically and horizontally arranged around the pixel of interest.

If a non-background pixel is contained in the surrounding 24 pixels (YES in step S1603), then in step S1605, the color reduction processing unit 1305 performs the color reduction processing using the same color as the non-background pixel placed near the pixel of interest.

If no non-background pixel is contained in the surrounding 24 pixels (NO in step S1603), then in step S1606, the color reduction processing unit 1305 performs the color reduction processing using the representative color E closest to the pixel of interest.

Next, in step S1607, the color reduction processing unit 1305 determines whether the processing has been ended on all the pixels. If the processing has not been ended (NO in step S1607), the processing returns to step S1601. If the processing has been ended (YES in step S1607), the processing proceeds to step S1404.

The color reduction processing is performed in step S1403 in this manner

Next, in step S1404, the color information generation unit 307 generates the color information 308 based on the color reduced image 1306.

Steps S505 to S509 after that are similar to the processing in the first exemplary embodiment, so that the descriptions thereof will be omitted herein.

In this manner, the present exemplary embodiment can achieve efficient compression while keeping the color of a character written in a small point size or a thin line reproducible by an appropriate color by extracting each of the representative color of the pixels determined not to be an edge and the representative color of the pixels determined to be an edge.

In the following description, a fourth exemplary embodiment will be described. The third exemplary embodiment has been described using the example where each of the representative color of the pixels determined not to be an edge and the representative color of the pixels determined to be an edge are extracted. However, when these representative colors are similar colors, i.e., when the luminance difference and the color difference therebetween fall within a predetermined range, the compression efficiency can be further improved by integrating the representative colors into the same color.

For example, when the representative color E and the representative color NE are the colors illustrated in FIGS. 17C and 17D, respectively, as described in the third exemplary embodiment, the gray as the representative color E2 and the gray as the representative color NE3 may be determined to be similar colors and be integrated into the same color. For example, FIGS. 18A and 18B illustrate a result of the integration into the representative color NE3 corresponding to a large number of pixels.

Because the representative color E2 illustrated in FIG. 18A and the representative color NE3 illustrated in FIG. 18B are the same color, efficient compression can be achieved when the binary image generation unit 312 in FIG. 3 generates the binary image 313 for each of the colors.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-133367, filed Aug. 5, 2020, which is hereby incorporated by reference herein in its entirety.

What is claimed is:

1. An apparatus comprising:
a scanner that scans an image on a document to generate image data to be used in color reduction processing;
a controller;
wherein the controller performs the color reduction processing for quantizing a color in the generated image data,
wherein the controller changes, in a case where brightness of an edge pixel indicating an edge portion in an image based on the image data with the color quantized is equal to or higher than a threshold value, a pixel value of the edge pixel to a pixel value of a color of a pixel having highest brightness among pixels surrounding the edge pixel, and changes, in a case where the brightness of the edge pixel is lower than the threshold value, the pixel value of the edge pixel to a pixel value of a color of a pixel having lowest brightness among the pixels surrounding the edge pixel, and
wherein the controller compresses the image data in which the pixel value of the edge pixel is changed while dividing the image data by color, and
a network interface that transmits the compressed image data via a network, and
wherein decompressed image data of the compressed image data is transmitted to a printer and the printer prints onto a medium.

2. The apparatus according to claim 1, wherein the controller further calculates a color difference between a color of the edge pixel and the color of the pixel having the highest brightness among the pixels surrounding the edge pixel in the case where the brightness of the edge pixel is equal to or higher than the threshold value, and changes the pixel value of the edge pixel to the pixel value of the color of the pixel having the highest brightness among the pixels surrounding the edge pixel in a case where the color difference is smaller than a second threshold value.

3. The apparatus according to claim 1, wherein the controller further calculates a color difference between a color of the edge pixel and the color of the pixel having the lowest brightness among the pixels surrounding the edge pixel in the case where the brightness of the edge pixel is lower than the threshold value, and changes the pixel value of the edge pixel to the pixel value of the color of the pixel having the lowest brightness among the pixels surrounding the edge pixel in a case where the color difference is smaller than the second threshold value.

4. The apparatus according to claim 1, wherein the controller further compresses the image data using the Modified Modified Read (MMR) method.

5. The apparatus according to claim 1, wherein the controller further changes the pixel value of the edge pixel to the pixel value of the color of the pixel having the highest brightness among pixels excluding the edge pixel from 5×5 pixels arranged around the edge pixel in the case where the brightness of the edge pixel indicating the edge portion in the image based on the image data with the color quantized is equal to or higher than the threshold value, and changes the pixel value of the edge pixel to the pixel value of the color of the pixel having the lowest brightness among the pixels excluding the edge pixel from the 5×5 pixels arranged around the edge pixel in the case where the brightness of the edge pixel is lower than the threshold value.

6. A method performed by a controller of an apparatus having a scanner that scans an image on a document to generate image data to be used in color reduction processing and a network interface, the method comprising:
performing the color reduction processing for quantizing a color in the generated image data;
changing, in a case where brightness of an edge pixel indicating an edge portion in an image based on the image data with the color quantized is equal to or higher than a threshold value, a pixel value of the edge pixel to a pixel value of a color of a pixel having highest brightness among pixels surrounding the edge pixel, and changing, in a case where the brightness of the edge pixel is lower than the threshold value, the pixel value of the edge pixel to a pixel value of a color of a pixel having lowest brightness among the pixels surrounding the edge pixel;
compressing the image data in which the pixel value of the edge pixel is changed by the changing while dividing the image data by color, and
transmitting the compressed image data using the network interface via a network, and
printing decompressed image data of the compressed image data via a printer.

7. The method according to claim 6, wherein the changing calculates a color difference between a color of the edge pixel and the color of the pixel having the highest brightness among the pixels surrounding the edge pixel in the case where the brightness of the edge pixel is equal to or higher than the threshold value, and changes the pixel value of the edge pixel to the pixel value of the color of the pixel having the highest brightness among the pixels surrounding the edge pixel in a case where the color difference is smaller than a second threshold value.

8. The method according to claim 6, wherein the changing calculates a color difference between a color of the edge pixel and the color of the pixel having the lowest brightness among the pixels surrounding the edge pixel in the case where the brightness of the edge pixel is lower than the threshold value, and changes the pixel value of the edge pixel to the pixel value of the color of the pixel having the lowest brightness among the pixels surrounding the edge pixel in a case where the color difference is smaller than the second threshold value.

9. The method according to claim 6, wherein the compressing compresses the image data using the Modified Modified Read (MMR) method.

10. The method according to claim 6, wherein the changing changes the pixel value of the edge pixel to the pixel value of the color of the pixel having the highest brightness among pixels excluding the edge pixel from 5×5 pixels arranged around the edge pixel in the case where the brightness of the edge pixel indicating the edge portion in the image based on the image data with the color quantized is equal to or higher than the threshold value, and changes the pixel value of the edge pixel to the pixel value of the color of the pixel having the lowest brightness among the pixels excluding the edge pixel from the 5×5 pixels arranged around the edge pixel in the case where the brightness of the edge pixel is lower than the threshold value.

11. A non-transitory computer-readable storage medium storing a program that, when executed by a controller of an apparatus having a scanner that scans an image on a document to generate image data to be used in color reduction processing and a network interface, causes the controller to perform a method, the method comprising:
performing the color reduction processing for quantizing a color in the generated image data;
changing, in a case where brightness of an edge pixel indicating an edge portion in an image based on the image data with the color quantized is equal to or higher than a threshold value, a pixel value of the edge pixel to a pixel value of a color of a pixel having highest brightness among pixels surrounding the edge pixel, and changing, in a case where the brightness of the edge pixel is lower than the threshold value, the pixel value of the edge pixel to a pixel value of a color of a pixel having lowest brightness among the pixels surrounding the edge pixel;
compressing the image data in which the pixel value of the edge pixel is changed by the changing while dividing the image data by color; and
transmitting the generated image data using the network interface via a network, and printing decompressed image data of the compressed image data via a printer.

12. The non-transitory computer-readable storage medium according to claim 11, wherein the changing calculates a color difference between a color of the edge pixel and the color of the pixel having the highest brightness among the pixels surrounding the edge pixel in the case where the brightness of the edge pixel is equal to or higher than the threshold value, and changes the pixel value of the edge pixel to the pixel value of the color of the pixel having the highest brightness among the pixels surrounding the edge pixel in a case where the color difference is smaller than a second threshold value.

13. The non-transitory computer-readable storage medium according to claim 11, wherein the changing calculates a color difference between a color of the edge pixel and the color of the pixel having the lowest brightness among the pixels surrounding the edge pixel in the case where the brightness of the edge pixel is lower than the threshold value, and changes the pixel value of the edge pixel to the pixel value of the color of the pixel having the lowest brightness among the pixels surrounding the edge pixel in a case where the color difference is smaller than the second threshold value.

14. The non-transitory computer-readable storage medium according to claim 13, wherein the compressing compresses the image data using the Modified Modified Read (MMR) method.

15. The non-transitory computer-readable storage medium according to claim 11, wherein the changing changes the pixel value of the edge pixel to the pixel value of the color of the pixel having the highest brightness among pixels excluding the edge pixel from 5×5 pixels arranged around the edge pixel in the case where the brightness of the edge pixel indicating the edge portion in the image based on the image data with the color quantized is equal to or higher than the threshold value, and changes the pixel value of the edge pixel to the pixel value of the color of the pixel having the lowest brightness among the pixels excluding the edge pixel from the 5×5 pixels arranged around the edge pixel in the case where the brightness of the edge pixel is lower than the threshold value.

* * * * *